J. J. ALLEN.
TOOL FOR REFACING VALVE SEATS.
APPLICATION FILED AUG. 25, 1921.

1,406,139. Patented Feb. 7, 1922.

INVENTOR
Joseph J. Allen
HIS ATTYS

UNITED STATES PATENT OFFICE.

JOSEPH JAMES ALLEN, OF CROOK, ENGLAND.

TOOL FOR REFACING VALVE SEATS.

1,406,139.

Specification of Letters Patent.  Patented Feb. 7, 1922.

Application filed August 25, 1921. Serial No. 495,239.

*To all whom it may concern:*

Be it known that I, JOSEPH JAMES ALLEN, a subject of the King of Great Britain, residing at Crook, in the county of Durham, England, have invented certain new and useful Improvements in Tools for Refacing Valve Seats, (for which I have filed application in Great Britain May 1, 1920, application 12,101,) of which the following is a specification.

This invention relates to tools for re-facing valve seats; my object being to provide a compound re-facing tool of simple construction as hereinafter described, which, on being rotated, say through the medium of an ordinary hand-brace or by means of an ordinary drilling or other rotary machine, ensures the re-facing operations being carried on in a much more speedy and efficient manner than heretofore.

According to my invention, the compound re-facing tool comprises an angular milled cutter made up of a plurality of segmental jaws formed integral with a central upstanding screwed spindle fitted with a slidably mounted screwed gland which carries a flat milled cutter having a corresponding number of segmental jaws to that of the angular milled cutter. The jaws of the flat milled cutter pass down into the spaces between the jaws of the angular milled cutter so as to form a sliding fit therewith, and the flat milled cutter is made vertically adjustable on and relatively to the angular milled cutter through the medium of the screwed gland which carries it so as to give any desired adjustment between the two cutters to suit the work to be performed, while a lock-nut is employed on the screwed spindle of the angular milled cutter adapted to engage a head formed on the screwed gland and lock the two cutters together in the adjusted position.

The angular milled cutter is provided at its base with a steadying or centreing pin which, in the case of a valve seat having a bridge, passes down into the boss of the said bridge; while when the valve seat has a clear passage or opening, a disc plate is mounted on the centreing pin to ensure true rotary motion during the re-facing operations.

The flat milled cutter is used for the re-facing of flat surfaces, while the angular milled cutter is used for the re-facing of angular surfaces; and in this latter connection, it will be understood that the shape of the angular milled cutter may be modified to suit different requirements.

In order that the invention may be clearly understood, I will proceed to describe the same with reference to the accompanying drawnigs; wherein:—

Figure 1:
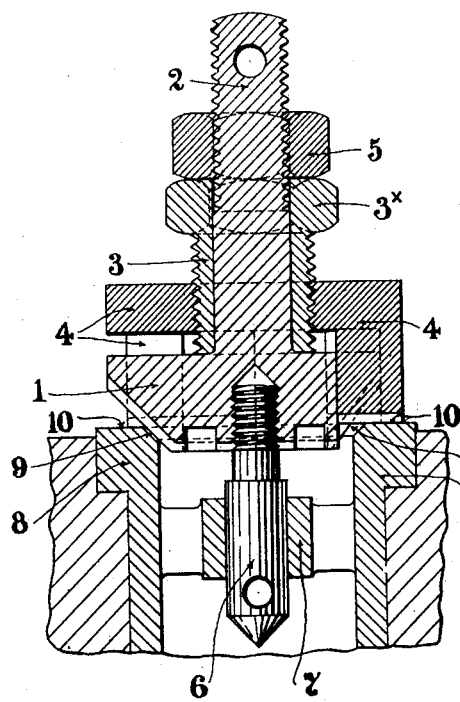
Figure 3:
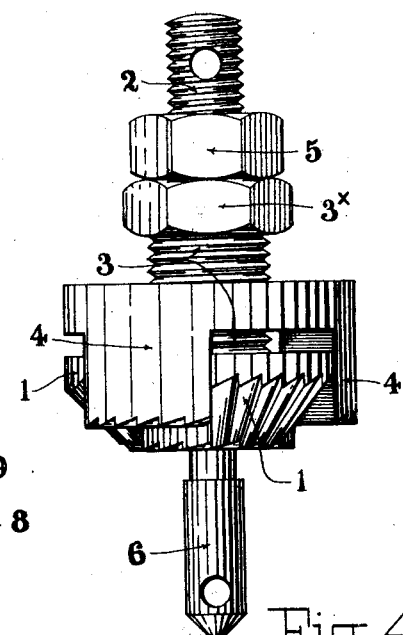
Figure 2:
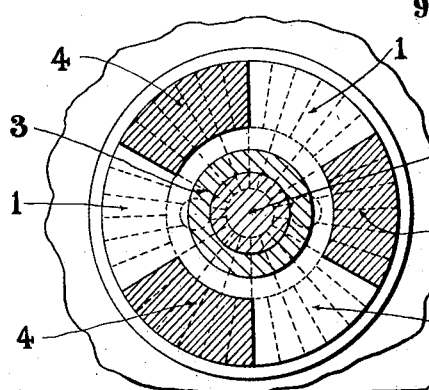
Figure 4:
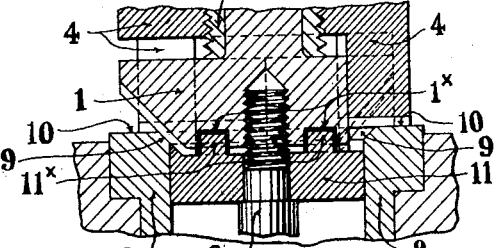
Figure 5:
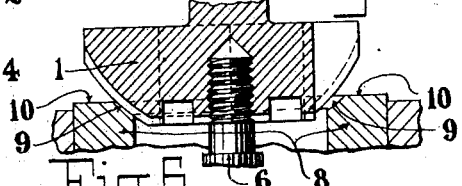
Figure 6:
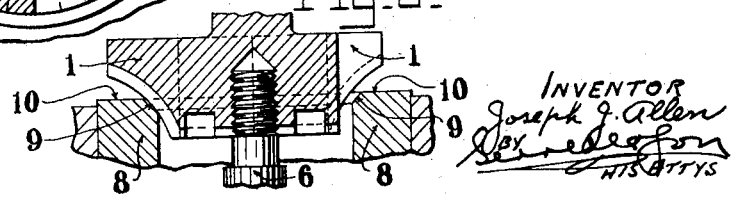

Figs. 1 and 2 are respectively a sectional elevation and a sectional plan of a compound re-facing tool constructed in accordance with my invention as applied to a valve seat having a bridge. Fig. 3 is an elevation of the same re-facing tool. Fig. 4 is a sectional elevation of a portion of the same re-facing tool showing it applied to a valve seat having a clear passage or opening; while Figs. 5 and 6 are sectional elevations of portions of the same re-facing tool showing modifications of construction.

Referring particularly to Figs. 1, 2 and 3 of the drawings, the compound re-facing tool comprises a three-jawed angular milled cutter 1 formed integral with a central upstanding screwed spindle 2 fitted with a slidably mounted screwed gland 3 carrying a three-jawed flat milled cutter 4 whose jaws pass down between the jaws of the angular milled cutter 1 so as to form a sliding fit therewith, and the flat milled cutter 4 is made vertically adjustable on and relatively to the angular milled cutter 1 through the medium of the screwed gland 3, while a lock-nut 5 on the screwed spindle 2 of the angular milled cutter 1 is adapted to engage a head 3ˣ formed on the screwed gland 3 and lock the two cutters 1, 4 together in the adjusted position.

Screwed into the base of the angular milled cutter 1 is a steadying or centreing pin 6 which passes down into the boss of the bridge 7 of the valve seat 8 to be re-faced (see Fig. 1); and assuming the cutters 1, 4 to have been "set" in the relative position shown in the drawings, the tool as a whole is rotated by passing its screwed spindle 2 into engagement with an ordinary hand-brace or with an ordinary drilling or other rotary machine (not shown), when the angular milled cutter 1 re-faces the angular surface 9 of the valve seat 8 while the flat milled cutter 4 simultaneously re-faces the flat surface 10 of the valve seat 8.

If the valve surfaces 9, 10 are required to be re-faced separately, the cutter 4 is raised or lowered relatively to the cutter 1 through the medium of the screwed gland 3 above referred to so as to enable the said cutters 1, 4 to be independently brought into operation.

Referring particularly to Fig. 4 of the drawings where the valve seat 8 has a clear passage or opening, a disc plate 11 is mounted on the centreing pin 6 having studs 11˟ engaging holes 1˟ in the base of the angular milled cutter 1 so as to ensure true rotary motion of the tool during the re-facing operations; otherwise the arrangement and operation of the tool is the same as that described with reference to Figs. 1, 2 and 3.

Referring particularly to Figs. 5 and 6 of the drawings, the angular milled cutter 1 is shaped to give a concave and convex face respectively to the angular surface 9 of the valve seat 8; otherwise the arrangement and operation of the tool is the same as that described with reference to Figs. 1, 2 and 3.

What I claim as my invention and desire to secure by Letters Patent is:—

1. A rotary tool for re-facing valve seats; comprising in combination, an angular milled cutter made up of a plurality of segmental jaws formed integral with a central upstanding screwed spindle, a screwed gland slidably mounted on said spindle, a flat milled cutter carried by said slidably mounted screwed gland and having a plurality of segmental jaws equal in number to and which pass down between the jaws of the angular milled cutter so as to form a sliding fit therewith, the said flat milled cutter being vertically adjustable on and relatively to the angular milled cutter through the medium of the screwed gland, and a lock-nut on the screwed spindle of the angular milled cutter adapted to engage a head formed on the screwed gland by which the two cutters are locked together in the adjusted position.

2. A rotary tool for re-facing valve seats; comprising in combination, an angular milled cutter made up of a plurality of segmental jaws formed integral with a central upstanding screwed spindle, a screwed gland slidably mounted on said spindle, a flat milled cutter carried by said slidably mounted screwed gland and having a plurality of segmental jaws equal in number to and which pass down between the jaws of the angular milled cutter so as to form a sliding fit therewith, the said flat milled cutter being vertically adjustable on and relatively to the angular milled cutter through the medium of the screwed gland, a lock-nut on the screwed spindle of the angular milled cutter adapted to engage a head formed on the screwed gland by which the two cutters are locked together in the adjusted position, and a steadying or centreing pin screwed into the base of the angular milled cutter.

3. A rotary tool for re-facing valve seats; comprising in combination, an angular milled cutter made up of a plurality of segmental jaws formed integral with a central upstanding screwed spindle, a screwed gland slidably mounted on said spindle, a flat milled cutter carried by said slidably mounted screwed gland and having a plurality of segmental jaws equal in number to and which pass down between the jaws of the angular milled cutter so as to form a sliding fit therewith, the said flat milled cutter being vertically adjustable on and relatively to the angular milled cutter through the medium of the screwed gland, a lock-nut on the screwed spindle of the angular milled cutter adapted to engage a head formed on the screwed gland by which the two cutters are locked together in the adjusted position, and a steadying or centreing pin screwed into the base of the angular milled cutter carrying a disc plate for ensuring true rotary motion.

In witness whereof I have hereunto set my hand in the presence of two witnesses.

JOSEPH JAMES ALLEN.

Witnesses:
  JOHN JOWETT,
  CYRIL BELLAMY.